United States Patent

Hederich et al.

[11] 3,894,060
[45] July 8, 1975

[54] ANTHRAQUINONE COMPOUNDS

[75] Inventors: Volker Hederich, Cologne; Dieter Dieterich, Leverkusen; Helmut Reiff; Günter Gehrke, both of Cologne, all of Germany

[73] Assignee: Bayer Aktiengesellschaft, Leverkusen-Bayerwerk, Germany

[22] Filed: Sept. 29, 1972

[21] Appl. No.: 293,590

[30] Foreign Application Priority Data
Sept. 30, 1971  Germany............................ 2148849

[52] U.S. Cl. ... 260/380; 260/247.1 A; 260/247.2 A; 260/247.2 B; 260/247.5 K; 260/247.5 H; 260/247.7 Z; 260/272; 260/326.33; 260/326.55; 260/326.55 F; 260/326.5 C; 260/333; 260/372; 260/373; 260/376; 260/377; 260/383; 8/39; 8/40
[51] Int. Cl. .......................... C09b 1/54; C09b 1/56
[58] Field of Search ........... 260/372, 373, 376, 377, 260/380, 383, 247.1 A, 247.2 A, 247.2 B, 247.5 H, 247.5 K, 247.72, 272, 326.33, 326.5 C

[56] References Cited
UNITED STATES PATENTS

| | | | |
|---|---|---|---|
| 2,844,598 | 7/1958 | Gunthard | 260/380 |
| 3,572,986 | 3/1971 | Gehrke | 260/380 |
| 3,642,835 | 2/1972 | Hederich et al. | 260/380 |
| 3,687,985 | 8/1972 | Maier | 260/376 |
| 3,694,467 | 9/1972 | Maier | 260/380 |
| 3,740,186 | 6/1973 | Hederich et al. | 260/377 |

FOREIGN PATENTS OR APPLICATIONS 973,336   10/1964   United Kingdom................. 260/380

*Primary Examiner*—Lorraine A. Weinberger
*Assistant Examiner*—E. Jane Skelly
*Attorney, Agent, or Firm*—Plumley & Tyner

[57] ABSTRACT

New anthraquinone compounds of the formulae

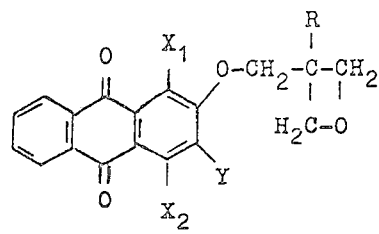

and

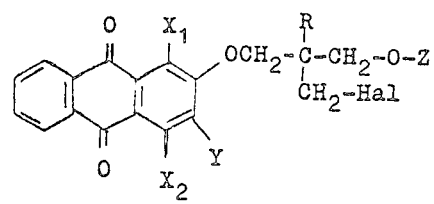

in which
X₁ denotes a hydroxyl or amino group,
X₂ denotes a hydroxyl, amino, alkylamino, cycloalkylamino, arylamino, acylamino, alkylmercapto or arylmercapto group,
Y represents hydrogen, halogen, alkylmercapto or arylmercapto radicals,
R represents an alkyl radical,
Hal represents chlorine, bromine or iodine and
Z represents hydrogen or an acyl radical,
as well as their manufacture and use for dyeing and printing synthetic fibre materials.

4 Claims, No Drawings

ANTHRAQUINONE COMPOUNDS

The subject of the present invention are new anthraquinone compounds of the formula

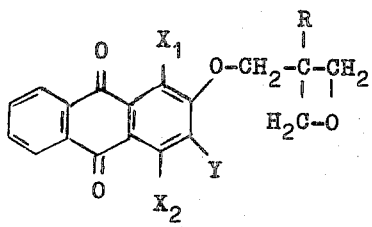

in which
X₁ denotes a hydroxyl or amino group,
X₂ denotes a hydroxyl, amino, alkylamino, cycloalkylamino, arylamino, acylamino, alkylmercapto or arylmercapto group,
R denotes an alkyl radical and
Y denotes hydrogen, halogen or an alkylmercapto or arylmercapto radical,
as well as their manufacture and use.

Suitable alkylamino radicals $X_2$ are those with 1–6 C atoms.

Suitable cycloalkylamino groups $X_2$ are especially cyclohexylamino radicals which are optionally substituted by $C_1$–$C_6$-alkyl radicals.

Suitable arylamino radicals $X_2$ are preferably phenylamino radicals which can be substituted by halogen atoms, $C_1$–$C_8$-alkyl, $C_1$–$C_4$-alkoxy, $C_1$–$C_4$-alkylmercapto, trifluoromethyl, acetylamino, phenyl, phenoxy or phenylamino groups, as well as a naphthylamine radical.

Suitable acylamino groups $X_2$ are those of the formula $$-NH-Q-T$$

in which
Q represents a —CO— or —SO₂— bridge and
T denotes a $C_1$–$C_{17}$-alkyl radical which is optionally substituted, for example by chlorine, nitrile, hydroxyl or $C_1$–$C_4$-alkoxy, a cyclohexyl radical or a phenyl radical which is optionally substituted by halogen, such as chlorine and bromine, $C_1$–$C_4$-alkyl, $C_1$–$C_4$-alkoxy or $C_1$–$C_4$-alkylmercapto.

Suitable alkylmercapto groups $X_2$ are preferably those with $C_1$–$C_{12}$ carbon atoms.

Suitable arylmercapto groups $X_2$ are preferably phenylmercapto groups which can be substituted by halogen atoms, $C_1$–$C_4$-alkyl or $C_1$–$C_4$-alkoxy radicals.

Possible alkyl radicals R are: unsubstituted lower alkyl radicals with 1–4 C atoms as well as methyl radicals substituted by hydroxyl, nitrile, $C_1$–$C_8$-alkoxy, $C_1$–$C_8$-alkylmercapto, $C_1$–$C_6$-alkylamino, $C_1$–$C_6$-dialkylamino (possibly part of a ring), cyclohexylamino, aryloxy or arylmercapto groups, with aryl to be understood preferentially as phenyl, or naphthyl, optionally substituted by $C_1$–$C_8$-alkyl, $C_1$–$C_4$-alkylmercapto, $C_1$–$C_4$-alkoxy and halogen.

As examples there may be mentioned: methyl, ethyl, propyl, butyl, ethoxymethyl, propoxymethyl, butoxymethyl, hexoxymethyl, cyclohexoxymethyl, ethylmercaptomethyl, butylmercaptomethyl, octylmercaptomethyl, phenoxymethyl, 4-chlorophenoxymethyl, 3-methylphenoxymethyl, 2,4-dimethylphenoxymethyl, 2,4,6-trimethylphenoxymethyl, 4-ethylphenoxymethyl, 4-tert.butylphenoxymethyl, 4-isooctylphenoxymethyl, 2-methoxyphenoxymethyl, 2-ethoxyphenoxymethyl, 4-isopropoxyphenoxymethyl, 4-methylmercaptophenoxymethyl and the 1- or 2-naphthoxymethyl radical. Further, phenylmercaptomethyl, 4-methylphenylmercaptomethyl, 4-chlorophenylmercaptomethyl, 4-tert.-butylphenylmercaptomethyl, 4-methoxyphenylmercaptomethyl, N,N-dimethylaminomethyl, N,N-diethylaminomethyl, N,N-dibutylaminomethyl, pyrrolidinomethyl, piperidinomethyl, morpholinomethyl, butylaminomethyl, cyclohexylaminomethyl and the hexylaminomethyl radical.

Preferred compounds of the formula I are those of the formula

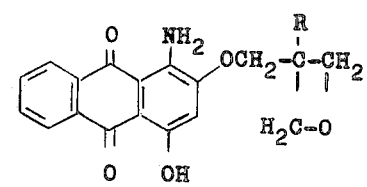

in which
R has the abovementioned meaning
as well as those of the formula

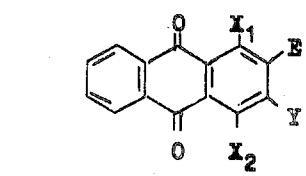

in which
R has the abovementioned meaning and
P represents a cyclohexyl radical which is optionally substituted by $C_1$–$C_6$-alkyl or a phenyl radical which is optionally substituted by halogen, $C_1$–$C_4$-alkyl or $C_1$–$C_4$-alkoxy.

The new anthraquinone compounds of the formula I are obtained by reacting anthraquinone derivatives of the formula

in which
X₁, X₂ and Y have the abovementioned meaning and
E represents a replaceable substituent,
with 3-hydroxymethyl-oxetanes of the formula

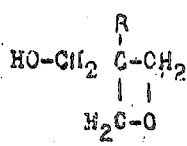

in which

R has the indicated meaning in the presence of strongly alkaline compounds, if appropriate in the presence of a suitable solvent, at temperatures of 100°–160°C, preferably 120°–140°C.

The reaction is preferably carried out in an excess of (V), which simultaneously serves as the solvent. Further suitable solvents are, for example, dimethylformamide, dimethylacetamide, dimethylsulphoxide, N-methylpyrrolidone, ε-caprolactam or pyridine.

Suitable strongly alkaline compounds are, for example, sodium hydroxide or potassium hydroxide or sodium carbonate or potassium carbonate.

Possible replaceable substituents E are in particular; halogen such as chlorine and bromine, lower alkoxy groups, optionally substituted aryloxy groups, preferably phenoxy groups, or sulphonic acid groups.

Suitable anthraquinone compounds of the formula IV are, for example: 1-amino-4-hydroxy-2-phenoxy-anthraquinone, 1-amino-4-hydroxy-2-(chlorophenoxy)-anthraquinone, 1-amino-4-hydroxy-2-methoxy-anthraquinone, 1-amino-4-hydroxy-2-bromoanthraquinone, 1-amino-4-hydroxy-2-chloro-anthraquinone, 1,4-diamino-2-phenoxy-anthraquinone, 1,4-dihydroxy-2-phenoxy-anthraquinone, 1,4-diamino-2-phenoxy-3-chloro-anthraquinone, 1,4-diamino-2-(o-chlorophenoxy)-3-bromo-anthraquinone, 1-amino-2-phenoxy-4-mesylamino-anthraquinone, 1-amino-2-phenoxy-4-tosylamino-anthraquinone, 1-amino-4-n-butylmercapto-anthraquinone-2-sulphonic acid, 1-amino-4-thiophenoxy-anthraquinone-2-sulphonic acid, 1-amino-4-methylthiophenoxy-anthraquinone-2-sulphonic acid, 1-amino-4-chlorophenylmercapto-anthraquinone-2-sulphonic acid, 1-amino-4-p-tert.butylthiophenoxy-anthraquinone-2-sulphonic acid, 1-amino-4-cyclohexylamino-anthraquinone-2-sulphonic acid, 1-amino-4-methylcyclohexylamino-anthraquinone-2-sulphonic acid, 1-amino-4-phenylamino-anthraquinone-2-sulphonic acid, 1-amino-4-methylphenylamino-anthraquinone-2-sulphonic acid, 1-amino-4-ethylpheylamino-anthraquinone-2-sulphonic acid, 1-amino-4-(dimethyl-ethylphenylamino)-anthraquinone-2-sulphonic acid, 1-amino-4-chlorophenylamino-anthraquinone-2-sulphonic acid, 1-amino-4-methoxyphenylamino-anthraquinone-2-sulphonic acid, 1-amino-4-ethoxyphenylamino-anthraquinone-2-sulphonic acid, 1-amino-4-methylmercaptophenylamino-anthraquinone-2-sulphonic acid, 1-amino-4-trifluoromethyl-phenylamino-anthraquinone-2-sulphonic acid, 1-amino-4-diphenylamino-anthraquinone-2-sulphonic acid, 1-amino-4-phenoxyphenylamino-anthraquinone-2-sulphonic acid and 1-amino-4-naphthylamino-anthraquinone-2-sulphonic acid.

The oxetanes of the formula V used as starting materials can be manufactured according to processes which are in themselves known; for example according to such processes as are described in "Methoden der organischen Chemie" ("Methods of Organic Chemistry") by Houben-Weyl, volume VI/3, page 493 ff.

Suitable oxetanes of the formula V are, for example: 3-methyl-3-hydroxymethyloxetane, 3-ethyl-3-hydroxymethyloxetane, 3-n-butyl-3-hydromethyloxetane, 3,3-bis-hydroxymethyloxetane, 3-cyanomethyl-3-hydroxymethyloxetane, 3-ethoxymethyl-3-hydroxymethyloxetane, 3-propoxymethyl-3-hydroxymethyloxetane, 3-butoxymethyl-3-hydroxymethyloxetane, 3-hexoxymethyl-3-hydroxymethyloxetane, 3-butylmercaptomethyl-3-hydroxymethyloxetane, 3-phenoxymethyl-3-hydroxymethyl-oxetane, 3-chlorophenoxymethyl-3-hydroxymethyl-oxetane, 3-methylphenoxymethyl-3-hydroxymethyl-oxetane, 3-dimethylphenoxymethyl-3-hydroxymethyl-oxetane, 3-trimethylphenoxymethyl-3-hydroxymethyl-oxetane, 3-ethylphenoxymethyl-3-hydroxymethyloxetane, 3-tert.butylphenoxymethyl-3-hydroxymethyl-oxetane, 3-isooctylphenoxymethyl-3-hydroxymethyl-oxetane, 3-methoxyphenoxymethyl-3-hydroxymethyl-oxetane, 3-ethoxyphenoxymethyl-3-hydroxymethyl-oxetane, 3-isopropoxyphenoxymethyl-3-hydroxymethyl-oxetane, 3-methylmercaptophenoxymethyl-3-hydroxymethyloxetane, 3-naphthoxymethyl-3-hydroxymethyl-oxetane, 3-phenylmercaptomethyl-3-hydroxymethyloxetane, 3-methyl-phenylmercaptomethyl-3-hydroxymethyloxetane, 3-tert.-butyl-phenylmercaptomethyl-3-hydroxymethyloxetane, 3-chlorophenylmercaptomethyl-3-hydroxymethyloxetane, 3-butylaminomethyl-3-hydroxymethyloxetane, 3-dimethylaminomethyl-3-hydroxymethyloxetane, 3-diethylaminomethyl-3-hydroxymethyloxetane, 3-pyrrolidinomethyl-3-hydroxymethyloxetane, 3-piperidinomethyl-3-hydroxymethyloxetane and 3-cyclohexylaminomethyl-3-hydroxymethyloxetane.

The anthraquinone compounds of the formula I obtainable according to the process of the invention are valuable dyestuff intermediate products. They can, for example, be converted by means of hydrogen halide acids, if appropriate whilst using inert organic solvents, through splitting of the oxetane ring, into corresponding halogenomethyl-hydroxypropoxy-anthraquinones which are new dyestuffs for dyeing synthetic fibres and fabrics.

If aliphatic carboxylic acids and hydrogen halide acids are used simultaneously, valuable anthraquinone dyestuffs for synthetic fibres and fabrics are again obtained, which in addition to the halogenomethyl group also contain an acyloxy group in the side chain. The oxetane ring contained in the anthraquinone compounds of the formula I is furthermore accessible to additional reactions such as are described, for example, in "Methoden der organischen Chemie" ("Methods of Organic Chemistry") by Houben-Weyl, volume VI/3, page 510 ff.

However the compounds of the formula I, optionally mixed with one another, are also outstandingly suitable for dyeing and printing synthetic fibres and fabrics, for example of cellulose triacetate, polyamides or, preferably, aromatic polyesters. They are dyed or printed in accordance with the methods customary for these fibres. Cellulose triacetate and polyamide fibres can be dyed at about 100°C, optionally in the presence of the customary auxiliaries. When dyeing fibres of aromatic polyesters, for example polyethylene glycol terephthalate, the customary carriers can be added or the dyeing can be carried out without addition of carrier, at 120°–130°C under pressure. The dyeings can also be fixed by a brief heat treatment at 190°–220°C.

It is advantageous to reduce the dyestuffs to a finely divided state in accordance with the customary methods before they are used, for example by grinding or kneading, preferably in the presence of customary dispersing agents.

Using the abovementioned processes, strong clear yellow, red or blue dyeings of very good fastness properties, especially excellent fastness to light, sublimation and thermofixing, are obtained with the anthraquinone compounds of the formula I on the fibres mentioned.

A further subject of the present invention are new anthraquinone compunds of the formula

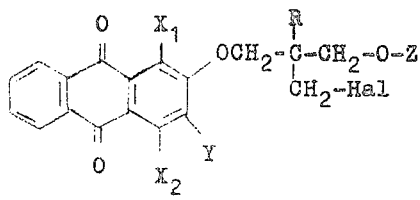

in which
$X_1$ denotes a hydroxyl or amino group,
$X_2$ denotes a hydroxyl, amino, alkylamino, cycloalkylamino, arylamino, acylamino, alkylmercapto or arylmercapto group,
Y represents hydrogen, halogen, alkylmercapto or arylmercapto radicals,
R represents an alkyl radical,
Hal represents chlorine, bromine or iodine and
Z represents hydrogen or an acyl radical,
as well as their manufacture and use for dyeing and printing synthetic fibre materials.

The radicals $X_1$, $X_2$, Y and R have already been defined in more detail above.

Possible acyl radicals Z are: alkylcarbonyl, cycloalkylcarbonyl, aralkylcarbonyl and arylcarbonyl radicals.

Suitable alkylcarbonyl radicals are those with 1 to 17 C atoms in the alkyl radicals, which can be further substituted by halogen, preferably Cl, acetyl, phenoxy, nitrile and $C_1$–$C_4$-alkoxy.

A suitable cycloalkylcarbonyl radical is the cyclohexylcarbonyl radical.

Suitable aralkylcarbonyl radicals are radicals of phenylacetic acid and cinnamic acid.

Suitable arylcarbonyl radicals are benzoyl radicals which are optionally substituted, for example by halogen, preferably Cl, $C_1$–$C_4$-alkyl, $C_1$–$C_4$-alkoxy, phenyl or phenoxy, as well as radicals of the naphthoic acids.

Preferred dyestuffs of the formula (1) are those of the formula

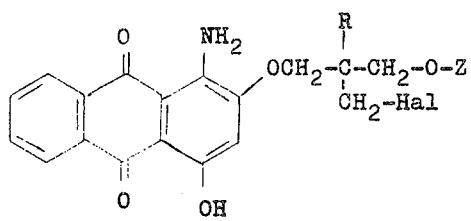

in which
R, Z and Hal have the indicated meaning,
as well as those of the formula

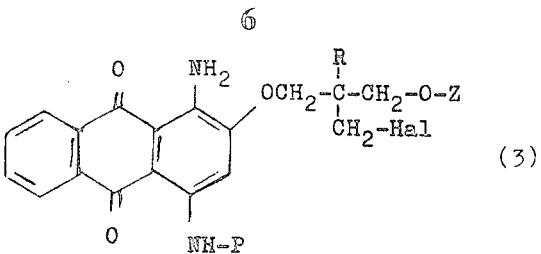

in which
R, Z and Hal have the indicated meaning and
P represents a cyclohexyl radical optionally substituted by $C_1$–$C_6$-alkyl or a phenyl radical opstituted by halogen, $C_1$–$C_4$-alkyl or $C_1$–$C_4$-alkoxy. tionally substituted by halogen, $C_1$–$C_4$-alkyl or $C_1$–$C_4$-alkoxy.

Particularly preferred dyestuffs of the formula (1) are those of the formula (2) and (3) in which
Z represents hydrogen.

The new anthraquinone compounds of the formula (1) can be manufactured according to various processes.

Those compounds of the formula (1)
in which
Z represents a hydrogen atom
are obtained, for example, by treating anthraquinone compounds of the formula

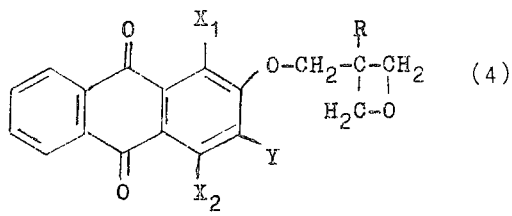

in which
$X_1$, $X_2$, Y and R have the abovementioned meaning with hydrogen halide acids, optionally in the presence of organic solvents.

The hydrogen halide acids can be employed both in a dilute or concentrated aqueous form and in a gaseous form, and in the former case the organic solvents possibly to be used are advantageously miscible with water whilst when using gaseous hydrogen halide acids it is advisable to use inert solvents which are immiscible with water.

Suitable solvents are, in addition to aromatic hydrocarbons such as benzene, toluene, xylene, chlorobenzene, dichlorobenzene, nitrobenzene and anisole, alcohols such as methanol, ethanol, propanol and butanol, as well as ethylene glycol monomethyl or dimethyl or monoethyl or diethyl ethers, tetrahydrofurane, dioxane, dimethylsulphoxide, sulpholane, N-methylpyrrolidone, dimethylformamide, caprolactam, carbon tetrachloride, acetone, methyl ethyl ketone, cyclohexanone and others.

In carrying out the process in practice, the general procedure is to warm the starting materials (4), in the appropriate aqueous hydrogen halide acid as the reaction medium, to 30°–80°C for a brief time, or to pass hydrogen halide into the solution or suspension of (4) in suitable solvents, preferably at 30°–100°C, or to add aqueous hydrogen halide acids dropwise and subsequently to isolate the resulting reaction products by precipitation with methanol or water or by driving off the solvent used.

Those anthraquinone dyestuffs of the formula (1) in which

Z represents an acyl radical are obtained by esterification of the compounds of the formula (1) in which Z represents hydrogen in accordance with methods which are in themselves known, by reaction with suitable alkyl-, cycloalkyl-, aralkyl- or aryl-carboxylic acids or their functional derivatives, by which there are to be understood the acid anhydrides and possibly also the acid halides and acid esters.

The appropriate derivatives of the following acids may be mentioned as examples: acetic acid, chloroacetic acid, dichloroacetic acid, trichloroacetic acid, propionic acid, butyric acid, pentanoic acid, 2-methylbutyric acid, trimethylacetic acid, isobutyric acid, 2-ethylbutyric acid, hexanoic acid, heptanoic acid, octanoic acid, decanoic acid, dodecanoic acid, tetradecanoic acid, hexadecanoic acid, methoxyacetic acid, ethoxyacetic acid, acetoacetic acid, cyanoacetic acid, cyclohexanecarboxylic acid, benzoic acid, chlorobenzoic acid, methylbenzoic acid, ethylbenzoic acid, p-tert.butylbenzoic acid, methoxybenzoic acid, dichlorobenzoic acid, phenylbenzoic acid, phenoxybenzoic acid, benzophenonecarboxylic acid, phenoxyacetic acid, phenylacetic acid and naphthoic acid.

In some cases it has proved advantageous if the dyestuffs of the formula (1) in which Z denotes an acyl radical are manufactured in a one-pot process which is characterised in that anthraquinone compounds of the formula

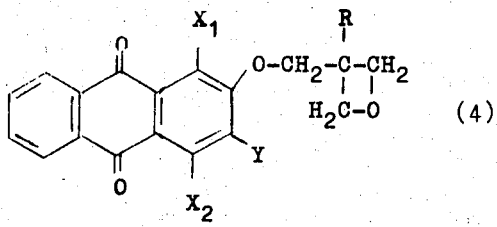

(4)

in which $X_1$, $X_2$, Y and R have the indicated meaning are reacted with an inorganic acid halide in an excess alkanecarboxylic acid and optionally in the presence of an inert solvent.

Suitable inorganic acid halides are, for example, $SOCl_2$, $SO_2Br_2$, $SO_2Cl_2$, $POCl_3$ and $PCl_5$.

The reaction temperature is preferably between 20° and 50°C.

Those dyestuffs of the formula (1) in which

Z represents an alkylcarbonyl radical can be manufactured particularly simply and economically in accordance with the one-pot process described above, by replacing the relatively expensive inorganic acid halides by a hydrogen halide acid.

Here, an appropriate procedure is to treat the anthraquinone compounds of the formula (4), dissolved or suspended in excess alkanecarboxylic acid, for example acetic acid, optionally in the presence of an inert organic solvent, with at least one equivalent of gaseous hydrogen halide at temperatures of 0° to 200°C, preferably 25° to 150°C. The water liberated in the reaction is appropriately distilled off azeotropically, using suitable entraining agents such as benzene.

The anthraquinone compounds of the formula (4) required as the starting material for the various processes are new. These compounds are obtained, for example, in accordance with the process indicated earlier by reacting anthraquinone derivatives of the formula

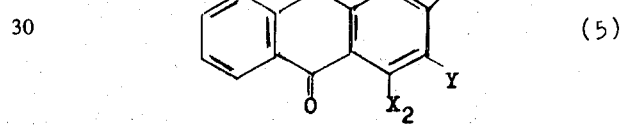

(5)

in which $X_1$, $X_2$ and Y have the indicated meaning and

E represents a replaceable substituent, in the presence of an acid acceptor and optionally in an organic solvent, with 3-hydroxymethyloxetanes of the formula

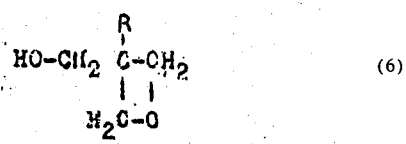

(6)

in which

R has the abovementioned meaning.

Examples of anthraquinone derivatives of the formula (4) are:

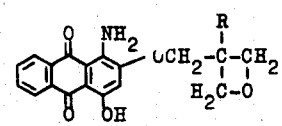 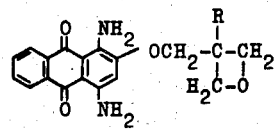 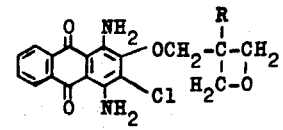

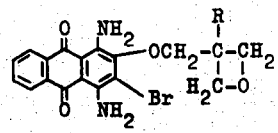 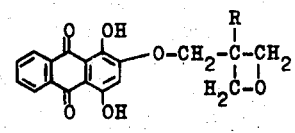 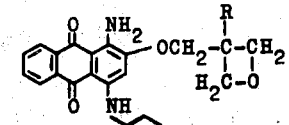

—Continued

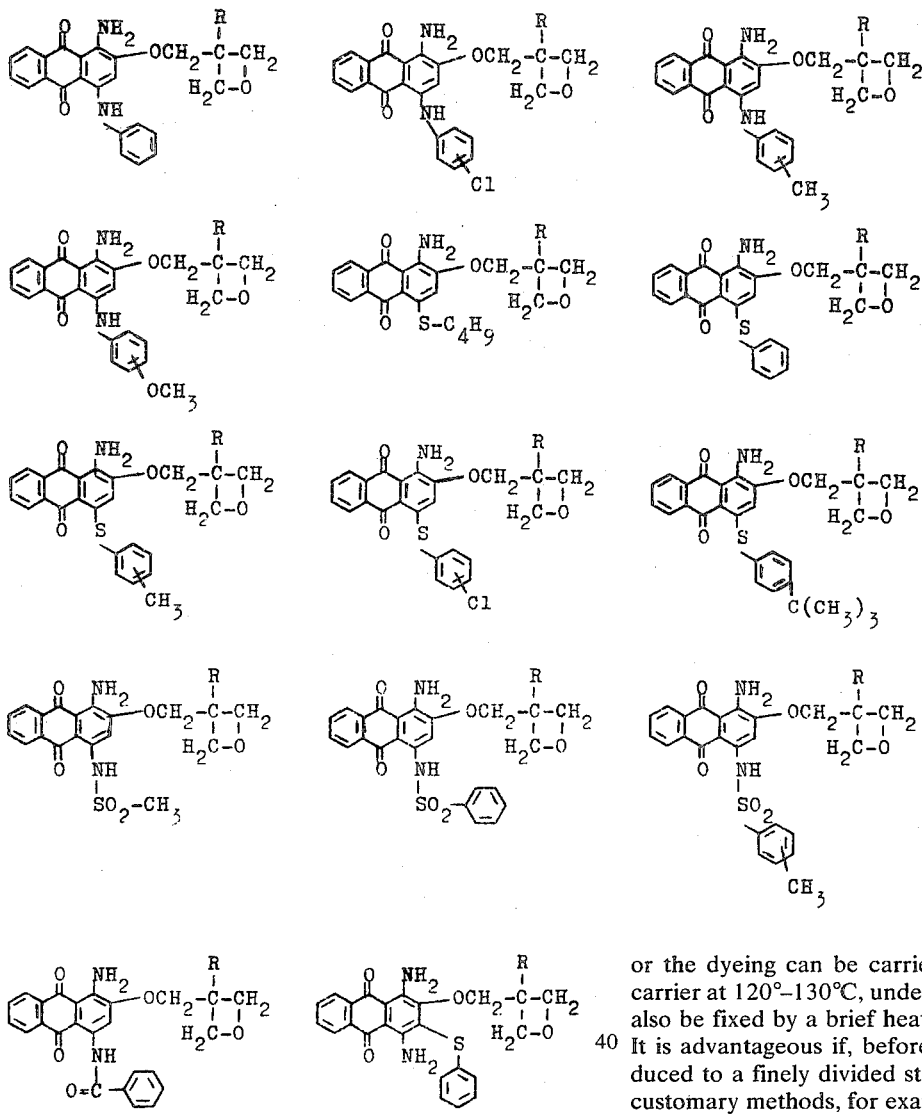

in which R can in all cases represent

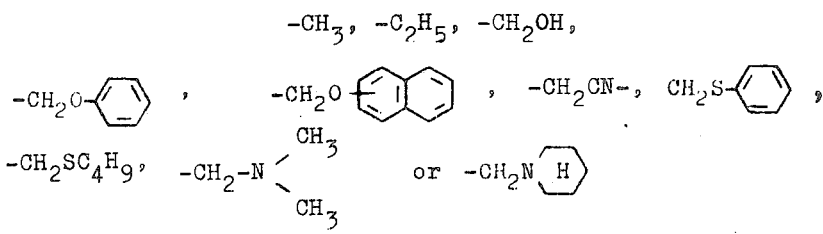

The new dyestuffs of the formula (1) are outstandingly suitable, optionally also mixed with one another, for dyeing synthetic materials, especially for dyeing and/or printing fibres, filaments, woven fabrics, knitted fabrics, tapes, films or sheets of synthetic origin, but above all for dyeing and printing synthetic fibre materials. They are dyed or printed in accordance with the methods customary for the fibres. Cellulose triacetate and polyamide fibres can be dyed at about 100°C from aqueous liquors, optionally in the presence of the customary auxiliaries. When dyeing fibres of aromatic polyesters, for example polyethylene glycol terephthalate, the customary carriers can be added to the dyebath or the dyeing can be carried out without addition of carrier at 120°–130°C, under pressure. The dyeings can also be fixed by a brief heat treatment at 190°–220°C. It is advantageous if, before use, the dyestuffs are reduced to a finely divided state in accordance with the customary methods, for example by grinding or kneading, preferably in the presence of customary dispersing agents.

The dyestuffs according to the invention are furthermore in part suitable for the continuous dyeing of synthetic fibre materials from organic solvents which are immiscible with water and of which the boiling points lie between 40° and 150°C, these being especially aliphatic chlorinated hydrocarbons, such as tetrachloroethylene, trichloroethylene and 1,1,1-trichloroethylene, as well as aliphatic fluoro- or fluorochloro-hydrocarbons, such as perfluoro-n-hexane, 1,2,2-trifluoro-trichloroethane and 1,1,1-trifluoropentachloropropane and aromatic chloro- and fluorohydrocarbons, such as chlorobenzene, fluorobenzene, chlorotoluene and benzotrifluoride.

For dyeing, the dyestuffs to be used according to the invention are dissolved in water-immiscible organic solvents or are added to these in the form of solutions in solvents which are infinitely miscible with these solvents, such as alcohols, dimethylformamide, dimethylacetamide, dimethylsulphoxide or sulpholane, and the synthetic fibre materials are impregnated with the resulting clear dyestuff solutions which can optionally additionally contain soluble non-ionic auxiliaries, for example the known surface-active oxethylation and propoxylation products of fatty alcohols, alkylphenols, fatty acid amides and fatty acids, in order to improve the evenness of the dyeings. Thereafter, the dyestuffs are fixed onto the fibre materials by a heat treatment. The heat treatment can consist of a brief dry heat treatment at 120°–230°C, with the dry heat treatment optionally being preceded by an intermediate drying, or can consist of a treatment of the fibre materials in superheated solvent vapour at 100°–150°C. Small proportions of non-fixed dyestuff can be eluted by brief treatment with the cold organic solvent. It should be pointed out that mixtures of the dyestuffs to be used according to the invention at times give a better colour yield than the individual dyestuffs and may display better solubility in the organic medium.

Using the abovementioned process, strong orange-coloured red or violet dyeings of good fastness properties, especially good fastness to light, sublimation and thermofixing, are obtained with the dyestuffs of the formula (1) on the fibres mentioned.

In the examples which follow, unless otherwise stated, the parts indicated are parts by weight.

EXAMPLE 1

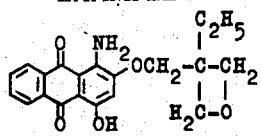

a. 100 parts of 3-hydroxymethyl-3-ethyloxetane are mixed with 100 parts of ε-caprolactam and 4 parts of powdered potassium hydroxide. After adding 30 parts of 1-amino-2-phenoxy-4-hydroxy-anthraquinone the reaction mixture is stirred for 4½ hours at 130°–140°C, subsequently cooled to approx. 60°C and treated with 200 parts by volume of methanol. The red dyestuff crystals which have separated out are filtered off and washed with methanol and water. 26.5 parts of the indicated compound, melting at 237–9°C after recrystallisation from glacial acetic acid, are obtained.

b. If the procedure indicated in Example 1a is followed, but using 300 parts of 3-hydroxymethyl-3-ethyloxetane and without the addition of a further solvent, 25.2 parts of the same compound are obtained after 12 hours' reaction time.

c. 1 part of this dyestuff, which has beforehand been reduced to a finely divided state in the presence of dispersing agents, is dispersed in 400 parts of water. 100 parts of polyester fibres (polyethylene terephthalate) are dyed in the resulting dyebath, in the presence of 15 parts of o-cresotic acid methyl ester as the carrier, for 120 minutes at the boil. A clear red dyeing of very good fastness to light and to sublimation is obtained.

EXAMPLE 2

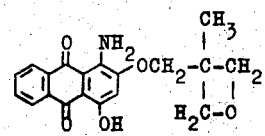

a. 30 parts of 1-amino-2-phenoxy-4-hydroxy-anthraquinone are introduced into a mixture of 90 parts of 3-hydroxymethyl-3-methyloxetane, 60 parts of N-methylpyrrolidone and 4 parts of potassium hydroxide. After heating to 130°–140°C for 2 hours, the transetherification is complete. The mixture is diluted with 200 parts by volume of methanol and the dyestuff which has separated out is filtered off and washed with methanol and water. 26.7 parts of the indicated compound, melting at 248–50°C after recrystallisation from pyridine, are obtained.

b. The same dyestuff is obtained if instead of 1-amino-2-phenoxy-4-hydroxy-anthraquinone, 1-amino-2-methoxy-4-hydroxy-anthraquinone is employed, or if potassium hydroxide is replaced by sodium hydroxide.

c. 100 parts of 3-hydroxymethyl-3-methyloxetane, 10 parts of phenol, 2 parts of potassium hydroxide and 10 parts of 1-amino-2-bromo-4-hydroxy-anthraquinone are heated to 130°C until no further starting material is detectable. After completion of the reaction, the mixture is cooled to about 80°C and 100 parts by volume of methanol, 20 parts of water and 2 parts of glacial acetic acid are added. The dyestuff which has separated out is filtered off after cooling, washed with methanol and water and dried. 8.3 parts of the indicated compound are obbtained.

d. 100 parts of polyester fibres (polyethylene terephthalate) are dyed with 1 part of this dyestuff, which has beforehand been brought to a finely divided state with the customary auxiliaries, in 3,000 parts of water for 1 hour at 125°–130°C under pressure. A strong, red dyeing having very good fastness properties is obtained.

EXAMPLE 3

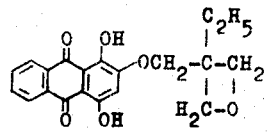

a. 120 parts of 3-hydroxymethyl-3-ethyloxetane, 150 parts of ε-caprolactam, 4 parts of potassium hydroxide and 33 parts of 1,4-dihydroxy-2-p-chlorophenoxy-anthraquinone are heated to 130°–140°C for 4 hours. After working-up with methanol and water, 27.3 parts of the indicated compound are obtained, melting at 168–9°C after recrystallisation from pyridine.

b. 100 parts of polyester fibres (obtained by polycondensation of terephthalic acid with dimethylolcyclohexane) are dyed with 1 part of this dyestuff, which has beforehand been brought to a finely divided state with customary auxiliaries, in 3,000 parts of water for one hour at 125°–130°C under pressure. A strong, orange dyeing having very good fastness properties is obtained.

EXAMPLE 4

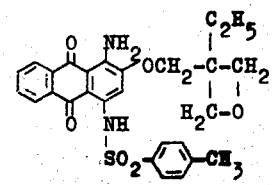

a. 60 parts of 1-amino-2-phenoxy-4-p-tosylamino-anthraquinone, 2 parts of potassium hydroxide, 60 parts of 3-hydroxymethyl-3-ethyloxetane and 30 parts of N-methylpyrrolidone are heated to 140°C for 18 hours. After working-up with methanol and water, 8.5 parts of the indicated compound are obtained, melting at 175–6°C after recrystallisation from pyridine.

b. A fabric of polyester fibres (polyethylene terephthalate) is impregnated on a padder with a liquor which contains, per litre, 20 g of dyestuff of the above structure which has beforehand been brought to a finely divided state in the presence of dispersing agents. The fabric is squeezed out to a weight increase of 70% and is dried at 100°C. Thereafter it is treated with hot air for 60 seconds at 190°–220°C in order to fix the dyeing, rinsed, washed hot and dried. A strong red dyeing of very good fastness to light, sublimation and rubbing is obtained.

EXAMPLE 5

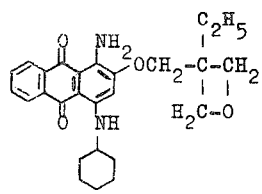

a. 20 parts of 1-amino-4-hexahydroanilino-anthraquinone-2-sulphonic acid are mixed with 40 parts of 3-hydroxymethyl-3-ethyloxetane and 20 parts of N-methylpyrrolidone. After adding 2 parts of potassium hydroxide, the mixture is stirred for 5 minutes at 150°C and cooled, 80 parts by volume of methanol and 20 parts of water are added and the precipitate which has separated out is filtered off. After washing with methanol and water, 16.2 parts of the indicated compound are obtained, melting at 236–7°C after recrystallisation from pyridine.

b. 100 parts of polyamide fabric are dyed with 1 part of the dyestuff thus manufactured, which has beforehand been brought to a finely divided state in accordance with the customary methods, in 4,000 parts of water for 1 hour at 100°C. The fabric is subsequently rinsed warm and cold, and dried. A clear violet dyeing of very good fastness to washing and to light is obtained.

EXAMPLES 6–30

The anthraquinone compounds (A) listed in Table 1, which are characterised by their melting points given in the table, are manufactured analogously to the description in Examples 1–5.

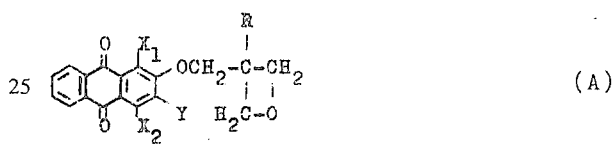 (A)

Table 1

| Example | $X_1$ | $X_2$ | Y | R | Melting point [°C] |
|---|---|---|---|---|---|
| 6 | $NH_2$ | $NH_2$ | H | $C_2H_5$ | 167 – 8 |
| 7 | OH | OH | H | $CH_3$ | 210 – 1 |
| 8 | $NH_2$ | NH–⟨⟩ | H | $C_2H_5$ | 238 – 40 |
| 9 | $NH_2$ | S–⟨⟩–Cl | H | $C_2H_5$ | 248 – 9 |
| 10 | $NH_2$ | $NH_2$ | Cl | $C_2H_5$ | 168 – 9 |
| 11 | $NH_2$ | NH–⟨⟩–CO–$CH_3$ | H | $C_2H_5$ | 135 – 6 |
| 12 | $NH_2$ | NH–⟨⟩–Cl | H | $C_2H_5$ | 167 – 8 |
| 13 | $NH_2$ | NH–⟨⟩–Cl | H | $C_2H_5$ | 227 – 8 |
| 14 | $NH_2$ | NH–⟨⟩–$OCH_3$ | H | $C_2H_5$ | 169 – 70 |
| 15 | $NH_2$ | NH–⟨⟩–$CH_3$ | H | $C_2H_5$ | 182 – 3 |
| 16 | $NH_2$ | NH–⟨⟩–OH | H | $C_2H_5$ | 198 – 200 |
| 17 | $NH_2$ | S–⟨⟩–$C(CH_3)_3$ | H | $C_2H_5$ | 274 – 5 |
| 18 | $NH_2$ | S–⟨⟩ | H | $C_2H_5$ | 207 – 9 |
| 19 | $NH_2$ | S–⟨⟩–$CH_3$ | H | $C_2H_5$ | 181 – 2 |
| 20 | $NH_2$ | S–⟨⟩–$CH_3$ | H | $C_2H_5$ | 233 – 4 |
| 21 | $NH_2$ | S—$C_4H_9$ | H | $C_2H_5$ | 142 – 3 |
| 22 | $NH_2$ | $NH_2$ | S–⟨⟩–Cl | $C_2H_5$ | 132 – 5 |
| 23 | $NH_2$ | $NH_2$ | S–⟨⟩ | $C_2H_5$ | 160– 1 |

Table 1 —Continued

| Example | X₁ | X₂ | Y | R | Melting point [°C] |
|---|---|---|---|---|---|
| 24 | NH₂ | NH—CO—(CH₂)₁₀CH₃ | H | C₂H₅ | 84 – 6 |
| 25 | NH₂ | NH—CO— | H | C₂H₅ | 234 – 5 |
| 26 | NH₂ | NH—CO— | H | C₂H₅ | 229 – 30 |
| 27 | NH₂ | NH—SO₂— | H | C₂H₅ | 201 – 3 |
| 28 | NH₂ | OH | H | CH₂O——Cl | 227 – 8 |
| 29 | NH₂ | OH | H | CH₂O——CH₃ | 175 – 6 |
| 30 | NH₂ | OH | H | CH₂O— | 186 – 7 |

EXAMPLE 31

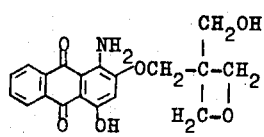

a. 45 parts of 3,3-bis-hydroxymethyl-oxetane, 15 parts of N-methylpyrrolidone, 2 parts of potassium hydroxide and 8 parts of 1-amino-2-phenoxy-4-hydroxy-anthraquinone are heated to 120°–130°C for 1¼ hours. After cooling, the resulting dyestuff is separated out by means of 60 parts by volume of methanol, filtered off and washed with methanol and water. 7.7 parts of the indicated compound are obtained, melting at 239°–240°C after recrystallisation from anisole.

b. 100 parts of a fabric of texturised polyethyleneterephthalate fibres are introduced at room temperature, without prior cleaning, into a dyebath which contains 1 part of the dyestuff manufactured according to Example 31a in 1,000 parts of tetrachloroethylene. The bath is heated to 115°C over the course of 10 minutes with vigorous circulation of the liquor and is kept at this temperature for 30 minutes. Then the liquor is separated off and the dyed goods are rinsed for 5 minutes with fresh solvent at approx. 40°C. After separating off the rinsing liquor, the dyed goods are centrifuged and dried in a stream of air. A red dyeing of very good fastness to sublimation and very good fastness to washing and light is obtained.

An equivalent red dyeing was obtained in the same manner on a fabric of polycyclohexane-dimethylene-terephthalate fibres.

If the tetrachloroethylene is replaced by the same amount of 1,1,2-trichloroethane, an equivalent dyeing is obtained.

EXAMPLE 32

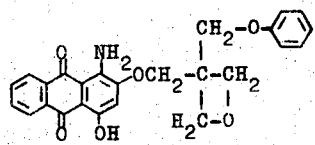

a. 20 parts of 3-phenoxymethyl-3-hydroxymethyloxetane, 20 parts of ε-caprolactam, 1 part of powdered potassium hydroxide and 5 parts of 1-amino-2-phenoxy-4-hydroxy-anthraquinone are heated to 130°–140°C for 5¾ hours. After cooling to approx. 80°C, 50 parts by volume of methanol are added. The dyestuff which has separated out is filtered off after cooling and is washed with methanol and water. 5.8 parts of the indicated compound, melting at 162–3°C after recrystallisation from pyridine, are obtained.

b. A previously cleaned and thermofixed fabric of polyethylene terephthalate is printed with a paste consisting of the following constituents:
    20 g of dyestuff, obtained according to Example 32a, in a finely divided form
    520 g of water
    450 g of crystal gum, 1:2
    10 g of cresotic acid methyl ester.
In order to fix the dyestuff, the printed and dried goods are treated with hot air for 40 seconds at 200°C. After soaping, rinsing and drying, a clear red print of very good fastness to light and to sublimation is obtained.

EXAMPLES 33–60

The dyestuffs listed in Table 2, which produce the indicated shade on woven or knitted fabrics of polyester, triacetate, polyamide, polyurethane or polyolefine fibres, are manufactured analogously to the reactions described in Examples 1–32, from the appropriate anthraquinone derivatives and suitable hydroxymethyloxetanes.

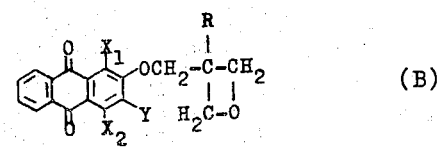 (B)

Table 2

| Example | X₁ | X₂ | Y | R | Colour shade |
|---|---|---|---|---|---|
| 33 | NH₂ | OH | H | CH₂O—C₆H₄—OCH₃ | Red |
| 34 | NH₂ | OH | H | CH₂O—C₆H₄(Cl) | Red |
| 35 | NH₂ | OH | H | CH₂O—C₆H₄(CH₃) | Red |
| 36 | NH₂ | NH₂ | H | CH₂OH | Violet |
| 37 | NH₂ | NH₂ | H | CH₃ | Violet |
| 38 | NH₂ | NH₂ | Br | CH₃ | Violet |
| 39 | NH₂ | NH₂ | SC₄H₉ | C₂H₅ | Blue |
| 40 | NH₂ | OH | H | CH₂O—C₆H₄—C(CH₃)₃ | Red |
| 41 | NH₂ | OH | H | CH₂O—C₆H₄(OCH₃) | Red |
| 42 | NH₂ | OH | H | CH₂O—C₆H₄—C₆H₁₁ | Red |
| 43 | OH | OH | H | CH₂O—C₆H₅ | Orange |
| 44 | OH | OH | H | CH₂O—naphthyl | Orange |
| 45 | OH | OH | H | CH₂OH | Orange |
| 46 | NH₂ | NH—C₆H₁₁ | H | CH₂O—naphthyl | Violet |
| 47 | NH₂ | NH—C₆H₁₁ | H | CH₂O—C₆H₅ | Violet |
| 48 | NH₂ | NH—C₆H₄—C(CH₃)₃ | H | C₂H₅ | Violet |
| 49 | NH₂ | NH—C₆H₄—OC₂H₅ | H | C₂H₅ | Violet |
| 50 | NH₂ | NH—C₆H₂(CH₃)₂(C₂H₅) | H | C₂H₅ | Violet |
| 51 | NH₂ | NH—C₄H₉ | H | CH₃ | Violet |
| 52 | NH₂ | NH—SO₂CH₃ | H | C₂H₅ | Red |
| 53 | NH₂ | NH—SO₂—CH₂—C₆H₅ | H | C₂H₅ | Red |
| 54 | NH₂ | NH—SO₂—C₂H₄—OCH₃ | H | C₂H₅ | Red |
| 55 | NH₂ | NH—SO₂—C₆H₅ | H | CH₂O—C₆H₅ | Red |
| 56 | NH₂ | NH—SO₂—C₆H₄—Cl | H | CH₂O—C₆H₄—Cl | Red |
| 57 | NH₂ | NH—CO—CH₃ | H | C₂H₅ | Red |
| 58 | NH₂ | NH—CO—C₂H₅ | H | CH₃ | Red |
| 59 | NH₂ | NH—CO—CH₂O—C₆H₅ | H | CH₃ | Red |
| 60 | NH₂ | NH—CO—CH₂—C₆H₅ | H | CH₃ | Red |
| 61 | NH₂ | OH | H | CH₂—S—C₄H₉ | Red |
| 62 | NH₂ | OH | H | CH₂—S—C₁₂H₂₅ | Red |
| 63 | NH₂ | OH | H | CH₂—S—C₆H₄—Cl | Red |
| 64 | NH₂ | OH | H | CH₂—S—C₆H₄—CH₃ | Red |
| 65 | NH₂ | OH | H | CH₂—S—C₆H₄—C(CH₃)₃ | Red |
| 66 | NH₂ | OH | H | CH₂—O—C₃H₇(n) | Red |
| 67 | NH₂ | OH | H | CH₂—O—C₄H₉(n) | Red |
| 68 | NH₂ | OH | H | CH₂—O—C₆H₁₃(n) | Red |
| 69 | NH₂ | OH | H | C₄H₉(n) | Red |
| 70 | NH₂ | OH | H | CH₂—N(C₂H₅)₂ | Red |
| 71 | OH | OH | H | CH₂—N(C₂H₅)₂ | Orange |
| 72 | NH₂ | OH | H | CH₂—morpholino | Red |

Table 2 — Continued

| Example | $X_1$ | $X_2$ | Y | R | Colour shade |
|---|---|---|---|---|---|
| 73 | $NH_2$ | OH | H | 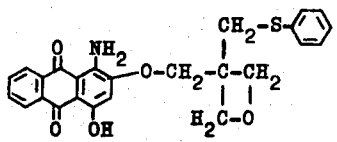 | Red |
| 74 | $NH_2$ | OH | H | $CH_2$-NH-$C_3H_7$ | Red |
| 75 | $NH_2$ | OH | H | 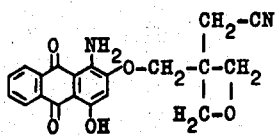 | Red |

EXAMPLE 76

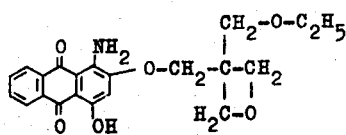

30 parts of 3-hydroxymethyl-3-phenylmercaptomethyl-oxetane (manufactured from the corresponding bromomethyl compound and thiophenol), 20 parts of ε-caprolactam, 1.5 parts of powdered potassium hydroxide and 7.5 parts of 1-amino-2-phenoxy-4-hydroxy-anthraquinone are heated to 130°–140°C for 2½ hours. After adding 60 parts by volume of methanol, the dyestuff which has separated out is filtered off, washed with methanol and water and dried. 8.7 parts of the above compound are obtained, melting at 194–5°C after recrystallisation from pyridine.

EXAMPLE 77

10 parts of 3-hydroxymethyl-3-ethoxymethyl-oxetane (manufactured from the 3-bromomethyl compound and sodium ethylate), 6 parts of N-methylpyrrolidone, 0.5 part of powdered potassium hydroxide and 2.5 parts of 1-amino-2-(p-chlorophenoxy)-4-hydroxy-anthraquinone are heated to 130°–140°C for 4¾ hours. After adding 25 parts by volume of methanol, the dyestuff which has separated out is filtered off, washed with methanol and water and dried. 2.4 parts of the indicated compound, melting at 149–50°C after recrystallisation from pyridine, are obtained.

EXAMPLE 78

2.5 parts of 1-amino-2-phenoxy-4-hydroxy-anthraquinone are introduced into a mixture of 11 parts of 3-cyanomethyl-3-hydroxymethyl-oxetane (manufactured from the 3-bromomethyl compound with sodium cyanide), 7 parts of ε-caprolactam and 0.5 part of powdered potassium hydroxide. After heating to 130°C for 1 hour, the reaction mixture is cooled to 80°C and 25 parts by volume of methanol are added. After cooling, the dyestuff which has separated out is filtered off and washed with methanol and water. 2.2 parts of the indicated compound melting at 284–6°C after recrystallisation from pyridine, are obtained.

EXAMPLE 79

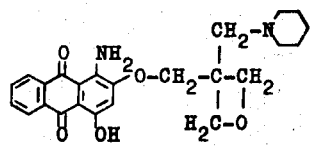

26 parts of 3-hydroxymethyl-3-piperidinomethyloxetane (manufactured from the 3-bromomethyl compound and piperidine in benzene) together with 10 parts of ε-caprolactam, 1 part of powdered potassium hydroxide and 6 parts of 1-amino-2-phenoxy-4-hydroxy-anthraquinone are heated to 130°–140°C for 14 hours. The resulting dyestuff is separated out by adding 40 parts by volume of methanol and 50 parts by volume of saturated sodium chloride solution. After filtering off and washing with water, 3.5 parts of the indicated compound, melting at 188–9°C after recrystallisation from pyridine, are obtained.

EXAMPLE 80

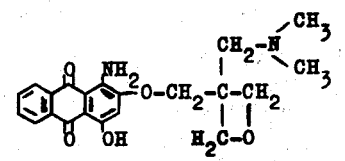

If, in the preceding example, 3-hydroxymethyl-3-piperidinomethyl-oxetane is replaced by the same amount of analogously manufactured 3-hydroxymethyl-3-dimethyl-aminomethyl-oxetane, 3.2 parts of a dyestuff of the indicated formula, melting at 170–1°C after recrystallisation from pyridine, are obtained.

EXAMPLE I

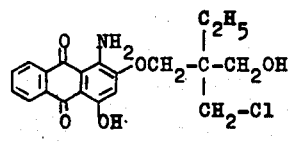

a. 5 parts of 3-(1-amino-4-hydroxy-anthraquinonyl-2)-oxymethyl-3-ethyl-oxetane are introduced into 80 parts of concentrated aqueous hydrochloric acid and the mixture is stirred for one-half hour at room temperature. The reaction mixture is subsequently poured into 500 parts of water and the product is filtered off, washed with water until neutral and dried. 5.5 parts of the indicated compound, melting at 168–9°C after recrystallisation from pyridine, are obtained.

b. 1 part of this dyestuff, which has beforehand been brought to a finely divided state in the presence of dispersing agents, is dispersed in 4,000 parts of water. 100 parts of polyester fibres (polyethylene terephthalate) are dyed in the resulting dyebath, in the presence of 15 parts of o-cresotic acid methyl ester as the carrier, for 120 minutes at the boil. A strong, clear, red dyeing of very good fastness properties, especially excellent fastness to light and sublimation, is obtained.

EXAMPLE II

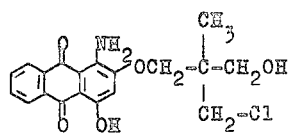

a. 3.5 parts of 3-(1-amino-4-hydroxy-anthraquinonyl-2-)-oxymethyl-3-methyl-oxetane in 40 parts of methyl ethyl ketone are heated to the boil with 3 parts of aqueous concentrated hydrochloric acid for 5 minutes. thereafter, 30 parts by volume of methanol and 40 parts of water are added and the product is filtered off cold. After washing with water and drying, 3.6 parts of the indicated compound, melting at 210–11°C after recrystallisation from chlorobenzene, are obtained.

b. If, in Example IIa, methyl ethyl ketone is replaced by the same amount of tetrahydrofurane, dioxane, ethylene glycol dimethyl ether, dimethylformamide or N-methylpyrrolidone and in other respects the indicated procedure is followed, the same dyestuff is obtained.

c. 100 parts of polyester fibres (polyethylene terephthalate) are dyed with 1 part of this dyestuff, which has beforehand been brought to a finely divided state with the customary auxiliaries, in 3,000 parts of water for 1 hour at 125–130°C under pressure. A clear, strong red dyeing having very good fastness properties is obtained.

EXAMPLE III

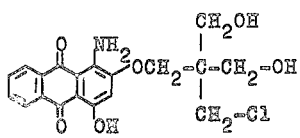

a. 18 parts of 3-(1-amino-4-hydroxy-anthraquinonyl-2)-oxymethyl-3-hydroxymethyloxetane are suspended in 100 parts of aqueous concentrated hydrochloric acid and the mixture is stirred for one-half hour at 40°C. After dilution with 500 parts of water, the product is filtered off and washed with water until neutral. 18.8 parts of the indicated compound, melting at 246–7°C after recrystallisation from anisole, are obtained.

b. 100 parts of a fabric of texturised polyethylene terephthalate fibres are introduced, without prior cleaning, into a dyebath at room temperature which has been prepared from 1 part of the dyestuff manufactured according to III and 1,000 parts of tetrachloroethylene. The bath is heated to 115°C over the course of 10 minutes with vigorous circulation of the liquor and is kept at this temperature for 30 minutes. The liquor is then separated off and the dyed goods are rinsed with fresh solvent at approx. 40°C for 5 minutes. After separating off the rinsing liquor, the dyed goods are centrifuged and dried in a stream of air. A strong red dyeing of excellent fastness to sublimation and very good fastness to washing and to light is obtained.

An equivalent red dyeing was obtained analogously on a fabric of polycyclohexane-dimethylene-terephthalate fibres.

If the tetrachloroethylene is replaced by the same amount of 1,1,2-trichloroethane, an equivalent dyeing is obtained.

EXAMPLE IV

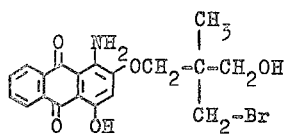

a. 4 parts of 3-(1-amino-4-hydroxy-anthraquinonyl-2-)-oxymethyl-3-methyl-oxetane in 40 parts of tetrahydrofurane are treated with 4 parts of 48% strength aqueous hydrobromic acid and the mixture is warmed to 50°–60°C for 5 minutes. After adding 50 parts by volume of methanol and 100 parts of water, and working-up as usual, 4.7 parts of dyestuff, melting at 202–3°C after recrystallisation from chlorobenzene, are obtained.

b. A dyebath is prepared from 1 part of the above dyestuff which has beforehand been brought to a finely divided state using the auxiliaries customary for the purpose, 6 parts of fatty alcohol-sulphonate and 3,000 parts of water, and 100 parts of cellulose triacetate fibres are dyed therein for 1 hour at 100°C. A yellowish-tinged red dyeing of very good fastness to washing, thermofixing and light is obtained.

EXAMPLE V

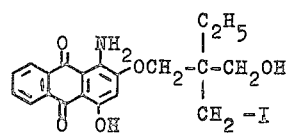

7 parts of 3-(1-amino-4-hydroxy-anthraquinonyl-2)-oxymethyl-3-ethyl-oxetane in 60 parts of acetonitrile are briefly heated to the boil with 5 parts by volume of 57% strength hydriodic acid. The crystals which have separated out after cooling are filtered off, washed with acetonitrile and water and dried. 8.8 parts of the indicated compound, melting at 165–6°C after recrystallisation from N-methylpyrrolidone, are obtained. On polyethylene terephthalate fibres, this dyestuff gives a strong red dyeing of very good fastness properties.

EXAMPLE VI a. 5 parts of 3-(1-amino-4-cyclohexylamino-anthraquinonyl-2)-oxymethyl-3-ethyloxetane in 50 parts of acetone are heated to the boil with 6 parts of 48% strength hydrobromic acid for 2 minutes. After adding 30 parts by volume of methanol and 40 parts of water, and dyestuff which has separated out is filtered off and washed with water. 5.1 parts of the indicated compound, melting at 153–4°C after recrystallisation from benzene, are obtained.

b. 100 parts of polyamide fabric are dyed with 1 part of the dyestuff manufactured in this way, which has beforehand been brought to a finely divided state in accordance with the customary methods, in 4,000 parts of water for 1 hour at 100°C. The fabric is subsequently rinsed warm and cold and dried. A strong violet dyeing of very good fastness to washing and light is obtained.

EXAMPLE VII a. 5 parts of 3-(1-amino-4-hydroxy-anthraquinonyl-2)-oxymethyl-3-ethyloxetane in 60 parts of methyl ethyl ketone are heated to the boil. After stopping the heating, hydrogen chloride gas is passed in for 5 minutes, whereupon a clear red dyestuff solution is obtained after a short time. The solution is diluted with 30 parts by volume of methanol and 60 parts of water and after working-up 5.3 parts of a dyestuff identical with that manufactured in Example Ia are obtained.

b. If, in Example VIIa, methyl ethyl ketone is replaced by the same amount of benzene, tetramethylenesulphone, anisole, carbon tetrachloride or butanol and in other respects the procedure indicated is followed, the reaction product separates out as the yellow hydrochloride, which is filtered off, washed with the particular solvent and converted into the dyestuff of Example Ia by treatment with methanol and water.

c. 100 parts of 3-hydroxymethyl-3-ethyloxetane, 100 parts of ε-caprolactam, 4 parts of potassium hydroxide and 30 parts of 1-amino-2-phenoxy-4-hydroxy-anthraquinone are heated to 130°–140°C for 4½ hours. Thereafter the mixture is cooled to 80°C and hydrogen chloride gas is passed in at this temperature, for 10 minutes. 200 parts by volume of methanol and 220 parts of water are then added. The dyestuff which has separated out is filtered off and washed with water. 27.8 parts of product which is identical with that manufactured according to Example Ia and dyes polyester materials in red shades having very good fastness properties are obtained.

EXAMPLE VIII

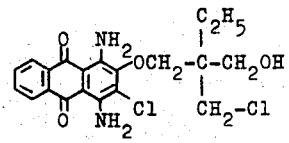

a. 3.5 parts of 3-(1,4-diamino-3-chloro-anthraquinonyl-2)-oxymethyl-3-ethyloxetane together with 50 parts of ethylene glycol monoethyl ether and 4 parts of aqueous concentrated hydrochloric acid are warmed to 60°–70°C for 5 minutes. The resulting dyestuff is separated out by adding 50 parts by volume of methanol and 20 parts of water, filtered off and washed with water. 3.7 parts of the indicated compound, melting at 197–8°C after recrystallisation from pyridine, are obtained.

b. 100 parts of polyester fibres (polyethylene terephthalate) are dyed with 1 part of this dyestuff, which has beforehand been brought to a finely divided state with the customary auxiliaries, in 3,000 parts of water for 1 hour at 125°–130°C under pressure. A clear, violet dyeing of very good fastness properties, especially very good fastness to light and sublimation, is obtained.

EXAMPLE IX

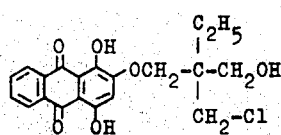

10 parts of 3-(1,4-dihydroxy-anthraquinonyl-2)-oxymethyl-3-ethyloxetane are dissolved in 100 parts of dimethylsulphoxide at 80°C. After adding 8 parts of aqueous concentrated hydrochloric acid, the mixture is stirred for 15 minutes at 80°C. The reaction product which has crystallised out after cooling is filtered off and washed with water. 10.6 parts of the indicated compound, melting at 174–5°C after recrystallisation from N-methylpyrrolidone, are obtained.

Using this dyestuff, a strong, clear orange dyeing of very good fastness properties is obtained on polyester fibres (polyethylene terephthalate) in accordance with the instructions in Example Ib or IIc.

EXAMPLE X

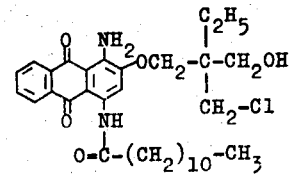

a. 4.5 parts of 3-(1,4-diamino-anthraquinonyl-2)-oxymethyl-3-ethyloxetane are dissovled in 45 parts of N-methylpyrrolidone. After adding 3.8 parts of lauric acid chloride at 30°–40°C, the mixture is stirred for a further one-half hour at 30°C. The reaction product is separated out by adding 50 parts by volume of methanol and 20 parts of water, whilst cooling with ice, and is filtered off and washed with 50% strength aqueous methanol. 6.6 parts of the indicated compound, melting at 61–2°C after recrystallisation from pyridine, are obtained.

b. A polyethylene terephthalate fibre fabric is impregnated at room temperature with a clear red solution which contains 10 parts of the dyestuff according to Example Xa and 7 parts of nonylphenol heptaethylene-glycol ether in 983 parts of tetrachloroethylene. After squeezing-out to a weight increase of 60%, the fabric is dried for one minute at 80°C. Thereafter the dyestuff is fixed by heating the fabric to 190°–220°C for 45 seconds. The small proportion of non-fixed dyestuff is then eluted by brief rinsing with cold tetrachloroethylene. After drying, a clear bluish-tinged red dyeing is obtained, which is distinguished by its very good build-up and by its good fastness properties.

EXAMPLE XI 5 parts of 3-(1-amino-4-hydroxy-anthraquinonyl-2)-oxymethyl-3-ethyloxetane in 50 parts of methyl ethyl ketone are warmed to 50°C. The reaction mixture is treated with 3 parts of aqueous concentrated hydrochloric acid and 1 part of 48% strength hydrobromic acid and is heated to the boil for 5 minutes. After adding 30 parts by volume of methanol and 70 parts of water, the reaction product which has separated out is filtered off and washed with water. 5.5 parts of a dyestuff mixture of which the components are identical with the dyestuffs described in Example I and XII are obtained.

On polyester fibres, the indicated dyestuff mixture yields a strong red dyeing of very good fastness properties.

EXAMPLE XII –XLIV

If an analogous procedure to that indicated in Examples I–X is followed with appropriate anthraquinonyloxymethyl-oxetanes, the dyestuffs listed in Table I are obtained, which have the melting points indicated in the table and yield the indicated shade on woven or knitted fabrics of polyester, triacetate, polyamide, polyurethane or polyolefine fibres.

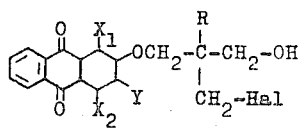

Table I

| Example | $X_1$ | $X_2$ | Y | R | Hal | Melting point [°C] | Solvent | Shade |
|---|---|---|---|---|---|---|---|---|
| XII | $NH_2$ | OH | H | $C_2H_5$ | Br | 167 – 8 | Dimethylsulphoxide | Red |
| XIII | OH | OH | H | $C_2H_5$ | Br | 147 – 9 | N-methylpyrrolidone | Orange |
| XIV | OH | OH | H | $C_2H_5$ | I | 186 – 7 | Glacial acetic acid | Orange |
| XV | OH | OH | H | $CH_3$ | Cl | 201 – 2 | Chlorobenzene | Orange |
| XVI | OH | OH | H | $CH_3$ | Br | 196 – 7 | Anisole | Orange |
| XVII | $NH_2$ | $NH_2$ | H | $C_2H_5$ | Cl | 175 – 6 | Chlorotoluene | Violet |
| XVIII | $NH_2$ | $NHSO_2$-⌬-$CH_3$ | H | $C_2H_5$ | Br | 182 – 3 | N-Methylpyrrolidone | Red |
| XIX | $NH_2$ | NH-⌬ (cyclohexyl) | H | $C_2H_5$ | Cl | 152 – 3 | Methyl ethyl ketone | Violet |
| XX | $NH_2$ | NH-⌬ | H | $C_2H_5$ | Cl | 217 – 8 | Methyl ethyl ketone | Violet |
| XXI | $NH_2$ | $NH_2$ | $OCH_2-C(C_2H_5)(CH_2Cl)-CH_2OH$ | $C_2H_5$ | Cl | 178 – 9 | Benzene | Violet |
| XXII | $NH_2$ | S-⌬-Cl | H | $C_2H_5$ | Cl | 178 – 80 | Dimethylformamide | Red |
| XXIII | $NH_2$ | NH-⌬-Cl | H | $C_2H_5$ | Cl | 170 – 1 | Anisole | Violet |
| XXIV | $NH_2$ | NH-⌬-Cl | H | $C_2H_5$ | Cl | 203 – 4 | Toluene | Violet |
| XXV | $NH_2$ | NH-⌬-$CH_3$ | H | $C_2H_5$ | Cl | 169 – 70 | Toluene | Violet |
| XXVI | $NH_2$ | NH-⌬-$OCH_3$ | H | $C_2H_5$ | Cl | 170 – 1 | Toluene | Violet |
| XXVII | $NH_2$ | NH-⌬-OH | H | $C_2H_5$ | Cl | 102 – 5 | Pyridine | Violet |
| XXVIII | $NH_2$ | S-⌬-$C(CH_3)_3$ | H | $C_2H_5$ | Cl | 175 – 6 | Toluene | Red |
| XXIX | $NH_2$ | S-⌬ | H | $C_2H_5$ | Cl | 162 – 3 | Pyridine | Red |
| XXX | $NH_2$ | S-⌬-$CH_3$ (meta) | H | $C_2H_5$ | Br | 168 – 9 | Toluene | Red |
| XXXI | $NH_2$ | S-⌬-$CH_3$ | H | $C_2H_5$ | Cl | 186 – 7 | Chlorobenzene | Red |
| XXXII | $NH_2$ | S-$C_4H_9$ | H | $C_2H_5$ | Cl | 142 – 3 | Toluene | Red |
| XXXIII | $NH_2$ | $NH_2$ | S-⌬ | $C_2H_5$ | Cl | 140 – 1 | Pyridine | Blue |
| XXXIV | $NH_2$ | $NH_2$ | S-⌬ | $C_2H_5$ | Br | 87 – 9 | N-Methylpyrrolidone | Blue |
| XXXV | $NH_2$ | S-⌬-$CH_3$ | H | $C_2H_5$ | I | 166 – 7 | N-Methylpyrrolidone | Red |
| XXXVI | $NH_2$ | $NH_2$ | Cl | $C_2H_5$ | I | 206 – 7 | N-Methylpyrrolidone | Violet |
| XXXVII | $NH_2$ | NH-CO-⌬ (cyclohexyl) | H | $C_2H_5$ | Cl | 189 – 90 | Methyl ethyl ketone | Red |
| XXXVIII | $NH_2$ | NH-CO-⌬ | H | $C_2H_5$ | Cl | 207 – 8 | Pyridine | Red |
| XXXIX | $NH_2$ | OH | H | $CH_2OH$ | Br | 224 – 5 | Anisole | Red |
| XL | $NH_2$ | $NH-SO_2$-⌬ (cyclohexyl) | H | $C_2H_5$ | Br | 175 – 6 | Methyl ethyl ketone | Red |
| XLI | $NH_2$ | NH-⌬-$COCH_3$ | H | $C_2H_5$ | Cl | 166 – 8 | Methyl ethyl ketone | Violet |
| XLII | $NH_2$ | OH | H | $CH_2O$-⌬-Cl | Cl | 207 – 8 | Chlorobenzene | Red |
| XLIII | $NH_2$ | OH | H | $CH_2O$-⌬-$CH_3$ | Cl | 174 – 5 | Perchloroethylene | Red |
| XLIV | $NH_2$ | OH | H | $CH_2O$-naphthyl | Cl | 90 – 2 | Ethanol | Red |

EXAMPLE XLV

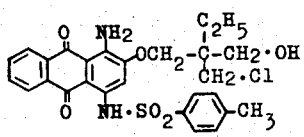

a. 25 parts of 3-(1-amino-4-p-tosylamino-anthraquinonyl-2)-oxymethyl-3-ethyl-oxetane in 300 parts of methyl ethyl ketone are heated with 30 parts of aqueous concentrated hydrochloric acid to the boil for 5 minutes. After adding 200 parts by volume of methanol and 200 parts of water, the dyestuff which has separated out is filtered off, washed with water and dried. 24.7 parts of the indicated compound, melting at 184–5°C after recrystallisation from pyridine, are obtained.

b. A fabric of polyester fibres (polyethylene terephthalate) is impregnated on a padder with a liquor which per litre contains 20 g of dyestuff according to Example XLVa, which has beforehand been brought into a finely divided state in the presence of dispersing agents customary for the purpose. The fabric is squeezed-out to a weight increase of 70% and is dried at 100°C. Thereafter it is treated with hot air at 190°–220°C for 60 seconds to fix the dyeing, rinsed, washed hot and dried. A strong red dyeing of very good fastness to light, sublimation and rubbing is obtained.

EXAMPLE XLVI

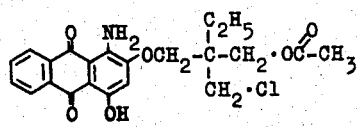

a. 5 parts of 3-(1-amino-4-hydroxy-anthraquinonyl-2)-oxymethyl-3-ethyloxetane are suspended in 60 parts of glacial acetic acid and the mixture is warmed to 80°C. Hydrogen chloride gas is passed in at this temperature for 10 minutes. 60 parts of benzene are added to the reaction batch and hydrogen chloride gas is passed in for 1 hour, in the course of which benzene, glacial acetic acid and water are distilled off simultaneously. After adding 60 parts by volume of methanol, the dyestuff which has separated out is filtered off and washed with methanol and water. 5.5 parts of the indicated compound, melting at 181–3°C after recrystallisation from pyridine, are obtained.

On polyethylene terephthalate fibres, this dyestuff yields a clear, yellowish-tinged red dyeing of very good fastness properties if the instructions of Example II c are followed.

b. The same dyestuff as described in Example XLVIa is obtained if 5 parts of the starting material described there, in 60 parts of glacial acetic acid, are treated with 6.4 parts of thionyl chloride and the mixture is stirred for 15 minutes at 35°C.

c. If 5.3 parts of 1-amino-4-hydroxy-2-(2-ethyl-2-chloromethyl-3-hydroxypropoxy)-anthraquinone, manufactured according to Example Ia, in 30 parts of glacial acetic acid are heated for 5 hours to the boil in the presence of 0.7 parts of anhydrous sodium acetate, and 40 parts by volume of ethanol and 15 parts of water are added, 5.3 parts of a dyestuff identical with that manufactured according to Example XLVIa or b are obtained.

EXAMPLE XLVII

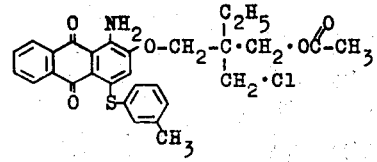

a. 4.2 parts of 3-(1-amino-4-m-tolylmercapto-anthraquinonyl-2)-oxymethyl-3-ethyl-oxetane in 60 parts of glacial acetic acid and 20 parts of benzene are warmed to approx. 80°C whilst passing hydrogen chloride through the mixture, until no further starting material is detectable and the benzene has been distilled off. After adding 60 parts by volume of ethanol and 20 parts of ice, the dyestuff which has separated out is filtered off and washed with 50% strength aqueous methanol. 4.6 parts of the indicated compound, melting at 137°–8°C after recrystallisation from pyridine, are obtained.

b. A polyethylene terephthalate fibre fabric is impregnated at room temperature with a clear red solution which contains 10 parts of the dyestuff manufactured according to Example XLVIIa in 990 parts of tetrachloroethylene. After squeezing-out to a weight increase of 60%, the fabric is dried for 1 minute at 80°C. Thereafter the dyestuff is fixed by heating the fabric to 190°–220°C for 45 seconds. Thereafter the small proportion of non-fixed dyestuff is eluted by a brief treatment for 20 seconds in cold tetrachloroethylene. After drying, a clear, bluish-tinged red dyeing is obtained which is distinguished by its high dyestuff yield, very good build-up and very good fastness properties, especially very good fastness to thermofixing, washing, rubbing and light.

Equivalent bluish-tinged red dyeings were obtained analogously also on fabrics of
a. cellulose triacetate
b. synthetic polyamides or polyurethanes and
c. polypropylene fibres
except that the thermosol treatment was carried out
at 200°–220°C for (a)
at 170°–200°C for (b) and
at 120°–150°C for (c).

Equivalent dyeings were also obtained if the 990 parts of tetrachloroethylene were replaced by the same amount of one of the following solvents: methylene chloride, chloroform, carbon tetrachloride, dichloroethane, trichloroethane, trichloroethylene, tetrachloroethane, dichloropropane, 1,1,1-trichloropropane, pentachloropropane, chlorobutane, dichlorobutane, dichlorohexane, perfluoro-n-hexane, 1,2,2-trifluorotrichloroethane and 1,1,1-trifluoro-pentachloropropane.

EXAMPLE XLVIII

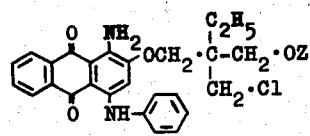

Z = 50 % H
50 % COC$_2$H$_5$ a. 8 parts of 3-(1-amino-4-hexahydroanilino-anthraquinonyl-2)-oxymethyl-3-ethyl-oxetane in 80 parts of propionic acid are warmed to 80°C. Hydrogen chloride gas is passed in at this temperature, whereupon the oxetane ring is firstly opened, with addition of hydrogen chloride. After approx. 50% of the reaction product have been converted into the corresponding propionic acid ester, which is the case after approx. one-half hour's introduction of hydrogen chloride, 80 parts by volume of ethanol and 20 parts of ice are added and the reaction mixture which has separated out is filtered off. After washing and drying, 8.2 parts of a dyestuff which consists of approximately equal parts of the anthraquinonyl-γ-hydroxypropoxy compound and its propionate are obtained.

b. 100 parts of polyamide fabric are dyed with 1 part of the dyestuff mixture manufactured in this way, which has beforehand been brought to a finely divided state in accordance with the customary methods, in 4,000 parts of water for 1 hour at 100°C. The fabric is subsequently rinsed warm and cold and dried. A strong, clear violet dyeing of very good fastness to washing and light is obtained.

EXAMPLE XLIX to LXIV

If an analogous procedure to that indicated in Examples XLVI to XLVIII is followed with the appropriate anthraquinonyl-oxymethyl-oxetanes or the compounds of Examples I to XLV, the dyestuffs listed in Table II are obtained, which have the melting points indicated in the table and yield the indicated shade on fabrics of polyester, triacetate, polyamide, polyurethane or polyolefine fibres.

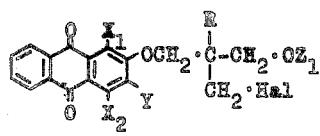

EXAMPLE LXV

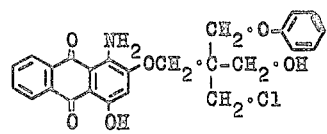

a. 1 part of 3-(1-amino-4-hydroxy-anthraquinonyl-2)-oxymethyl-3-phenoxymethyloxetane in 10 parts of methyl-ethyl ketone is heated to the boil for 5 minutes with 1 part of aqueous concentrated hydrochloric acid. The resulting dyestuff is separated out by adding 15 parts by volume of methanol and 15 parts of water. After filtering off, and washing with 50% strength aqueous methanol, 1 part of the indicated compound, melting at 134–5°C after recrystallisation from methyl ethyl ketone, is obtained.

b. A previously cleaned and thermofixed fabric of polyethylene terephthalate is printed with a paste consisting of the following constituents:

20 g of dyestuff obtained according to Example LXVa, in a finely divided state
520 g of water
450 g of crystal gum, 1:2
10 g of cresotic acid methyl ester.

To fix the dyestuff, the printed and dried goods are treated with hot air for 40 seconds at 200°C. After soaping, rinsing and drying, a clear red print of very good fastness to light and sublimation is obtained.

EXAMPLES LXVI to CIV

The dyestuffs listed in Table III are manufactured analogously to the description in Examples I to LXV. They yield the indicated shade on woven or knitted fabrics of polyester, triacetate, polyamide, polyurethane or polyolefine fibres.

Table II

| Example | $X_1$ | $X_2$ | Y | R | Hal | $Z_1$ | Melting point [°C] | Solvent | Shade |
| --- | --- | --- | --- | --- | --- | --- | --- | --- | --- |
| XLIX | $NH_2$ | OH | H | $C_2H_5$ | Cl | $COCH_2CH_3$ | 151–2 | Pyridine | Red |
| L | $NH_2$ | OH | H | $C_2H_5$ | Cl | $COCCl_3$ | 69–71 | N-Methylpyrrolidone | Red |
| LI | $NH_2$ | OH | H | $C_2H_5$ | Br | $COCH_3$ | 174–5 | N-Methylpyrrolidone | Red |
| LII | $NH_2$ | OH | H | $C_2H_5$ | Cl | $COCHCl_2$ | 165–6 | Pyridine | Red |
| LIII | $NH_2$ | NH-⟨⟩ | H | $C_2H_5$ | Cl | $COC_2H_5$ | 110–1 | Glacial acetic acid | Violet |
| LIV | $NH_2$ | OH | H | $C_2H_5$ | Br | $COC_2H_5$ | 154–5 | N-Methylpyrrolidone | Red |
| LV | $NH_2$ | OH | H | $C_2H_5$ | I | $COCH_3$ | 145–6 | Glacial acetic acid | Red |
| LVI | $NH_2$ | OH | H | $C_2H_5$ | Cl | $COC_7H_{9(n)}$ | 118–20 | Pyridine | Red |
| LVII | $NH_2$ | OH | H | $C_2H_5$ | Cl | $COCH_2CH(CH_3)_2$ | 147–8 | Pyridine | Red |
| LVIII | $NH_2$ | OH | H | $C_2H_5$ | Cl | CO-⟨⟩ | 179–80 | Pyridine | Red |
| LIX | $NHCOCH_3$ | OH | H | $C_2H_5$ | Cl | $COCH_3$ | 118–9 | N-Methylpyrrolidone | Yellow |
| LX | $NH_2$ | NHCO-⟨⟩ | H | $C_2H_5$ | Cl | $COCH_3$ | 175–6 | Glacial acetic acid | Red |
| LXI | $NH_2$ | $NHSO_2$-⟨⟩ | H | $C_2H_5$ | Cl | $COCH_3$ | 163–4 | Glacial acetic acid | Red |
| LXII | $NH_2$ | OH | H | $CH_3$ | Cl | $COCH_3$ | 151–2 | Pyridine | Red |
| LXIII | $NH_2$ | OH | H | $CH_3$ | Cl | $COC_2H_5$ | 141–2 | Pyridine | Red |
| LXIV | $NH_2$ | OH | H | $CH_2O$-⟨⟩-Cl | Cl | $COCH_3$ | 141–2 | Perchloroethylene | Red |

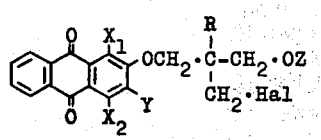

Table III

| Example | $X_1$ | $X_2$ | Y | R | Hal | Z | Shade |
|---|---|---|---|---|---|---|---|
| LXVI | $NH_2$ | OH | H | $CH_2O$-phenyl | Cl | $COCH_3$ | Red |
| LXVII | $NH_2$ | OH | H | $CH_2O$-phenyl-Cl | Cl | $COCH_3$ | Red |
| LXVIII | $NH_2$ | OH | H | $CH_2O$-phenyl-$CH_3$ | Cl | $COCH_3$ | Red |
| LXIX | $NH_2$ | OH | H | $CH_2O$-naphthyl | Br | CO-phenyl | Red |
| LXX | $NH_2$ | OH | H | $CH_3$ | Cl | CO-phenyl-Cl | Red |
| LXXI | $NH_2$ | $NH_2$ | H | $C_2H_5$ | Cl | CO-biphenyl | Violet |
| LXXII | $NH_2$ | $NH_2$ | H | $CH_2OH$ | Br | H | Violet |
| LXXIII | $NH_2$ | $NH_2$ | H | $C_2H_5$ | I | H | Violet |
| LXXIV | $NH_2$ | $NH_2$ | Cl | $CH_3$ | Cl | $COCH_3$ | Violet |
| LXXV | $NH_2$ | $NH_2$ | Br | $CH_3$ | Cl | H | Violet |
| LXXVI | $NH_2$ | $NH_2$ | Br | $CH_3$ | Br | H | Violet |
| LXXVII | $NH_2$ | $NH_2$ | $SC_4H_9$ | $C_2H_5$ | Cl | H | Blue |
| LXXVIII | $NH_2$ | $NH_2$ | $SC_{12}H_{25}$ | $C_2H_5$ | Cl | H | Blue |
| LXXIX | $NH_2$ | $NH_2$ | S-phenyl | $CH_3$ | Cl | CO-phenyl | Blue |
| LXXX | $NH_2$ | $NHC_4H_9$ | H | $C_2H_5$ | Cl | $CO.CH_2$-phenyl | Violet |
| LXXXI | $NH_2$ | NH-cyclohexyl | H | $CH_2OH$ | Cl | H | Violet |
| LXXXII | $NH_2$ | NH-cyclohexyl-$CH_3$ | H | $CH_2OH$ | Cl | H | Violet |
| LXXXIII | $NH_2$ | NH-phenyl-$C_2H_5$ | H | $CH_2.O$-phenyl | Cl | $CO.CH(CH_3)_2$ | Violet |
| LXXXIV | $NH_2$ | NH-(2,6-dimethylphenyl) | H | $CH_2.O$-phenyl-$OCH_3$ | Cl | $COCH_3$ | Violet |
| LXXXV | $NH_2$ | NH-phenyl-$OC_2H_5$ | H | $CH_2.O$-(2-methylphenyl) | Br | CO-phenyl-Cl | Violet |
| LXXXVI | $NH_2$ | NH-biphenyl | H | $CH_3$ | Br | CO-phenyl | Violet |
| LXXXVII | $NH_2$ | NH-phenyl-O-phenyl | H | $C_2H_5$ | Br | $COCH_2CH_2CH_3$ | Violet |
| LXXXVIII | $NH_2$ | NH-phenyl-NH-phenyl | H | $C_2H_5$ | Br | $COCH_3$ | Violet |
| LXXXIX | $NH_2$ | NH-naphthyl | H | $CH_3$ | I | H | Violet |
| XC | $NH_2$ | $NHSO_2CH_3$ | H | $CH_3$ | Cl | H | Red |
| XCI | OH | OH | H | $CH_2.O$-phenyl | Cl | H | Orange |
| XCII | OH | OH | H | $CH_2.O$-phenyl | Cl | H | Orange |
| XCIII | OH | OH | H | $CH_2.O$-phenyl-cyclohexyl | Cl | H | Orange |
| XCIV | OH | OH | H | $CH_2.O$-naphthyl | Cl | H | Orange |
| XCV | $NH_2$ | $NHSO_2C_2H_4OCH_3$ | H | $C_2H_5$ | Cl | H | Red |
| XCVI | $NH_2$ | $NHSO_2CH_2$-phenyl | H | $C_2H_5$ | Cl | H | Red |
| XCVII | $NH_2$ | $NHSO_2$-phenyl | H | $C_2H_5$ | Cl | H | Red |
| XCVIII | $NH_2$ | $NHSO_2$-(3-methylphenyl) | H | $C_2H_5$ | Br | $COCH_3$ | Red |

Table III—Continued

| Example | X₁ | X₂ | Y | R | Hal | Z | Shade |
|---|---|---|---|---|---|---|---|
| IC | NH₂ | NHSO₂—C₆H₄—OCH₃ | H | CH₃ | Br | COCH₃ | Red |
| C | NH₂ | NHCOCH₃ | H | C₂H₅ | I | COCH₃ | Red |
| CI | NH₂ | NHCOC₂H₅ | H | C₂H₅ | Cl | COC₂H₅ | Red |
| CII | NH₂ | NHCO.CH₂—C₆H₅ | H | CH₃ | Cl | CO.CH₂—C₆H₅ | Red |
| CIII | NH₂ | NHCO—C₆H₄—C₆H₅ | H | CH₃ | Cl | CO—C₆H₄—C₆H₅ | Red |
| CIV | NH₂ | NHCO—C₆H₄—Cl | H | CH₃ | Cl | CO—C₆H₅ | Red |
| CV | NH₂ | OH | H | CH₂—S—C₄H₉ | Cl | H | Red |
| CVI | NH₂ | OH | H | CH₂—S—C₁₂H₂₅ | Cl | H | Red |
| CVII | NH₂ | OH | H | CH₂—S—C₆H₅ | Cl | CO—CH₃ | Red |
| CVIII | NH₂ | OH | H | CH₂—S—C₆H₄—CH₃ | Cl | H | Red |
| CIX | NH₂ | OH | H | CH₂—S—C₆H₄—C(CH₃)₃ | Br | H | Red |
| CX | NH₂ | OH | H | CH₂—S—C₆H₄—Cl | Cl | H | Red |
| CXI | NH₂ | OH | H | CH₂—S—C₆H₄—Cl | Cl | CO—C₆H₅ | Red |
| CXII | NH₂ | OH | H | CH₂—OC₃H₇(n) | Cl | H | Red |
| CXIII | NH₂ | OH | H | CH₂—OC₄H₉(n) | Cl | H | Red |
| CXIV | NH₂ | OH | H | CH₂—OC₆H₁₃(n) | Cl | H | Red |
| CXV | OH | OH | H | CH₂—OC₂H₅ | Cl | CO—CH₃ | Orange |
| CXVI | NH₂ | NH—C₆H₅ | H | CH₂—OC₃H₇ | Cl | H | Violet |
| CXVII | NH₂ | OH | H | C₄H₉(n) | Cl | H | Red |
| CXVIII | NH₂ | OH | H | CH₂—NH—C₃H₇ | Cl | H | Red |
| CXIX | NH₂ | OH | H | CH₂—NH—C₆H₅ | Cl | H | Red |
| CXX | NH₂ | OH | H | CH₂—N(pyrrolidine) | Cl | H | Red |
| CXXI | NH₂ | OH | H | CH₂—N(morpholine) | Cl | H | Red |
| CXXII | NH₂ | OH | H | CH₂—N(C₂H₅)₂ | Cl | H | Red |

EXAMPLE CXXIII

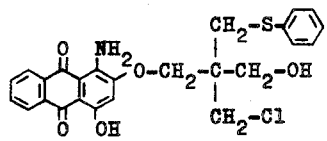

10 parts of 3-(1-amino-4-hydroxy-anthraquinonyl-2)-oxymethyl-3-phenylmercaptomethyl-oxetane in 80 parts of diethyl ketone are heated for 2 minutes to the boil with 6 parts of aqueous concentrated hydrochloric acid. The reaction product is separated out by adding 60 parts by volume of methanol and 30 parts of water, filtered off and washed with 50% strength aqueous methanol. 2.8 parts of the indicated dyestuff, melting at 150–2°C after recrystallisation from perchloroethylene, are obtained.

On polyethylene terephthalate fibres, this dyestuff yields a clear red dyeing of very good fastness properties.

EXAMPLE CXXIV

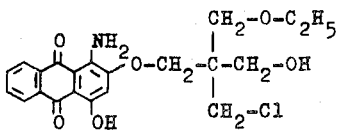

1 part of 3-(1-amino-4-hydroxy-anthraquinonyl-2)-oxymethyl-3-ethoxymethyl-oxetane in 20 parts of concentrated aqueous hydrochloric acid is stirred for 1 hour at 30°–40°C. Thereafter the reaction mixture is poured onto ice, the precipitate obtained is filtered off, and after washing with water and drying 1 part of the indicated compound is obtained, which melts at 156–7°C after recrystallisation from pyridine and yields a strong red dyeing of very good fastness properties on polyester fibres.

EXAMPLE CXXV

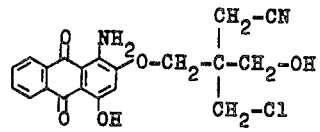

1 part of 3-(1-amino-4-hydroxy-anthraquinonyl-2)-oxymethyl-3-cyanomethyl-oxetane in 30 parts of methyl ethyl ketone is heated for 2 minutes to the boil with 1.5 parts of concentrated hydrochloric acid. The reaction product is separated out by adding 20 parts by volume of methanol and 20 parts of water. It is filtered off and washed with water, and 1 part of a dyestuff melting at 199°–200°C after recrystallization from chlorobenzene is obtained.

EXAMPLE CXXVI

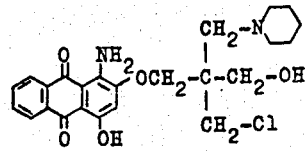

1 part of 3-(1-amino-4-hydroxy-anthraquinonyl-2)-oxymethyl-3-piperidino-methyl-oxetane in 20 parts of concentrated hydrochloric acid is warmed to 40°–50°C for 10 minutes. The dyestuff is separated out by adding 50 parts of water and 50 parts of saturated sodium chloride solution, filtered off and washed with 5% strength sodium chloride solution and with water. 1 part of the indicated compound, which melts at 252–4°C after recrystallisation from anisole and dyes polyester materials in red shades of good fastness properties, is obtained.

EXAMPLE CXXVII

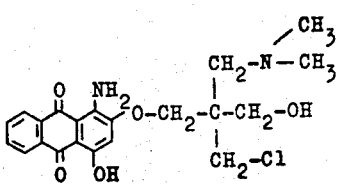

If an analogous procedure to that indicated in Example CXXVI is followed with 1 part of 3-(1-amino-4-hydroxyanthraquinonyl-2)-oxymethyl-3-N,N-dimethylaminomethyloxetane, 1 part of the indicated compound is obtained, which is isolated as the hydrochloride and melts at 252–4°C after recrystallisation from dimethylsulphoxide.

We claim:
1. Anthraquinone compound of the formula

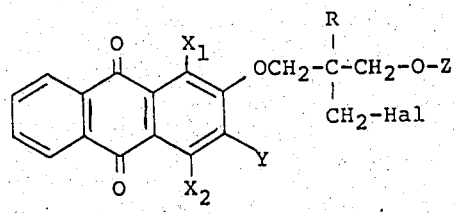

wherein
$X_1$ is hydroxyl or amino;
$X_2$ is hydroxyl, amino, $C_1$ –$C_6$ -alkylamino, cyclohexylamino, $C_1$ –$C_6$ -alkylcyclohexylamino, phenylamino, halophenylamino, $C_1$ –$C_8$ -alkylphenylamino, $C_1$ –$C_4$ -alkoxyphenylamino, $C_1$ –$C_4$ -alkylmercaptophenylamino, trifluoromethylphenylamino, acetylaminophenylamino, diphenylamino, phenoxyphenylamino, phenylaminophenylamino, naphthylamino, $C_1$ –$C_{12}$ -alkylmercapto, phenylmercapto, halophenylmercapto, $C_1$ –$C_4$ -alkylphenylmercapto, $C_1$ –$C_4$ -alkoxyphenylmercapto, or radicals having the formula $$-NH-CO-T \text{ or } -NH-SO_2-T$$

where
T is $C_1$ –$C_{17}$ -alkyl, cyclohexyl, phenyl, halophenyl, $C_1$ –$C_4$ -alkylphenyl, $C_1$ –$C_4$ -alkoxyphenyl, $C_1$ –$C_4$ -alkylmercaptophenyl, or $C_1$ –$C_{17}$ -alkyl substituted by chloro, cyano, hydroxyl or $C_1$ –$C_4$ -alkoxy;
Y is hydrogen, chloro, bromo,

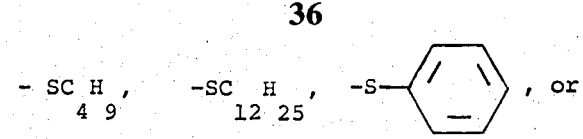

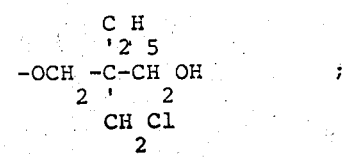

R is $C_1$ –$C_4$ -alkyl or methyl substituted by hydroxy, cyano, $C_1$ –$C_8$ -alkoxy, $C_1$ –$C_8$ -alkylmercapto, $C_1$ –$C_6$ -alkylamino, phenoxy, naphthoxy, phenylmercapto, naphthylmercapto, or any of the last four radicals further substituted by $C_1$ –$C_8$ -alkyl, $C_1$ –$C_4$ -alkylmercapto, $C_1$ –$C_4$ -alkoxy, or halo; Hal is chloro, bromo, or iodo; and
Z is hydrogen, $C_1$ –$C_{17}$ -alkylcarbonyl, cyclohexylcarbonyl, phenylacetyl, cinnamoyl, benzoyl, halobenzoyl, $C_1$ –$C_4$ -alkylbenzyl, $C_1$ –$C_4$ -alkoxybenzoyl, phenylbenzoyl, phenoxybenzoyl, naphthoyl, $C_1$ –$C_{17}$ -alkylcarbonyl substituted by halo, acetyl, phenoxy, cyano, or $C_1$ –$C_4$ -alkoxy.

2. Anthraquinone compound of the formula

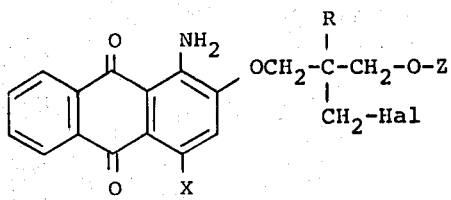

wherein
R is methyl, ethyl, butyl, or methyl substituted by hydroxy, cyano, phenoxy, naphthoxy, chlorophenoxy, methylphenoxy, methoxyphenoxy, ethoxy, propoxy, butoxy, hexoxy, butylmercapto, dodecylmercapto, phenylmercapto, methylphenylmercapto, t-butylphenylmercapto, chlorophenylmercapto, dimethylamino, diethylamino, propylamino, cyclohexylamino, piperidino, morpholino, or pyrrolidino;
X is hydroxyl, cyclohexylamino, $C_1$–$C_6$-alkylcyclohexylamino, phenylamino, halophenylamino, $C_1$–$C_4$-alkylphenylamino, or $C_1$–$C_4$-alkoxyphenylamino;
Hal is chloro, bromo, or iodo; and
Z is hydrogen or the acyl radical resulting from the removal of the hydroxyl from the carboxyl group of an acid from the group consisting of acetic acid, chloroacetic acid, dichloroacetic acid, trichloroacetic acid, propionic acid, butyric acid, pentanoic acid, 2-methylbutyric acid, trimethylacetic acid, isobutyric acid, 2-ethylbutyric acid, hexanoic acid, heptanoic acid, octanoic acid, decanoic acid, dodecanoic acid, tetradecanoic acid, hexadecanoic acid, methoxyacetic acid, ethoxyacetic acid, acetoacetic acid, cyanoacetic acid, cyclohexanecarboxylic acid, benzoic acid, chlorobenzoic acid, methylbenzoic acid, ethylbenzoic acid, p-tert.butylbenzoic acid, methoxybenzoic acid, dichlorobenzoic acid, phenylbenzoic acid, phenoxybenzoic acid, benzophenonecarboxylic acid, phenoxyacetic acid, phenylacetic acid and naphthoic acid.

3. Anthraquinone compound of the formula
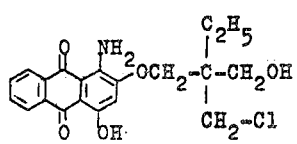
4. Anthraquinone compound of the formula
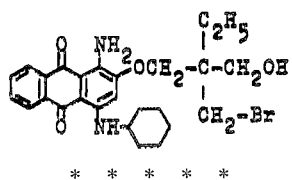
* * * * *